United States Patent [19]

Howell

[11] Patent Number: 4,699,807

[45] Date of Patent: Oct. 13, 1987

[54] FINISH RESTORER

[75] Inventor: John S. Howell, Ronkonkoma, N.Y.

[73] Assignee: Golden Age Furniture Finishing Products Co., Ronkonkoma, N.Y.

[21] Appl. No.: 916,290

[22] Filed: Oct. 7, 1986

[51] Int. Cl.4 .......................................... B32B 35/00
[52] U.S. Cl. ...................................... 427/140; 106/3; 106/5; 134/38; 252/529; 252/DIG. 8
[58] Field of Search ................... 427/140; 106/3, 4, 5; 134/38; 252/529, DIG. 8

[56] References Cited

U.S. PATENT DOCUMENTS 3,216,945  11/1965  Mankowich .................. 252/DIG. 8
4,612,058  9/1986  Geke et al. ............................ 134/38

Primary Examiner—Thurman K. Page
Assistant Examiner—Leon R. Horne
Attorney, Agent, or Firm—Brumbaugh, Graves, Donohue & Raymond

[57] ABSTRACT

A composition containing ethanolamine, a silicate and a protective colloid is useful to restore broken, crazed, or alligatored finishes without removing the intact finish beneath.

13 Claims, No Drawings

FINISH RESTORER

BACKGROUND OF THE INVENTION

This invention relates to a composition useful in restoring crazed or alligatored finishes, and to a method of using the composition.

Known compositions for treating a surface finished with, for example, shellac, lacquer, paint or varnish fall into two general categories: cleaners and strippers. Cleaners are intended to remove superficial soil on the finish but do not affect the finish itself. Strippers, on the other hand, are intended for the complete removal of the finish, and subsequent refinishing of the surface is required.

In many circumstances, particularly old finishes on antique furniture or finished surfaces exposed to weathering, the exterior surface of the finish begins to deteriorate, becoming crazed, broken, or "alligatored." Known cleaners are not effective at restoring such deteriorated finishes, but complete removal of the finish using a stripper may be unacceptable.

It is an object of the present invention to provide a finish restorer which is capable of reducing or eliminating the deterioration of the finish, while leaving a relatively smooth coating of the original behind.

SUMMARY OF THE INVENTION

The finish restorer according to the invention is an aqueous composition containing mono-, di- or triethanolamine, a silicate such as sodium or potassium silicate, and a protective colloid such as lecithin. Preferably, the finish restorer also contains a drying oil, such as tung oil or linseed oil.

Application of the finish restorer according to the invention to finished surfaces is accomplished with a clean cloth, fine steel wool, or fine grit sand paper. Rubbing the deteriorated surface progressively removes surface soil, ground-in dirt, and the deteriorated surface layer of the finish. The underlying non-deteriorated layers remain substantially intact, and after several days can be polished to achieve a level of gloss or shine comparable to a fresh finish.

DETAILED DESCRIPTION OF THE INVENTION

Finish restorers according to the invention advantageously comprise about 3% to about 6% triethanolamine; about 5% to about 8% potassium silicate; and about 0.4% to about 2.0% lecithin in water. In addition, from about 7% to about 35% linseed oil or other drying oil is preferably included.

In preparing the finish restorer, the ethanolamine and the silicate are separately mixed into portions of the water. These two diluted stocks are then combined. Ten percent aqueous lecithin is then added, and finally the linseed oil is added slowly with stirring.

The finish restorer can be advantageously used on a variety of deteriorating finishes, including shellac, oil-finish, lacquer, oil-based paint, varnish, and casein paint. In use, a small amount of the finish restorer is poured onto the finish and rubbed with increasing pressure using a dry cloth. In difficult cases, fine steel wool or sand paper may be required to completely remove the deteriorated surface. Once the damaged finish is removed, the finish restorer should be promptly removed to avoid damage to the underlying surface.

The finish restorer according to the invention in most cases leaves intact a relatively smooth coating of the original finish. This coating may be somewhat softened by the finish restorer, but it rehardens after a period of about two days. The rehardened restored finish can be polished or otherwise treated in a manner consistent with the nature of the finish. If the condition of the original finish was very poor, parts of the underlying surface may be exposed through the resulting restored finish. In this circumstance, a new finish can be applied directly over the rehardened restored finish without complete removal (stripping) of the finish.

EXAMPLES

A variety of different compositions were prepared as set forth in the Table, with the balance of each formulation being water. In each case, triethanolamine and potassium silicate were combined separately with water to form diluted stocks. The diluted stocks were then combined and the lecithin was added as a 10% aqueous solution with mixing. Finally, the desired quantity of linseed oil was slowly added while stirring the mixture.

Each of the compositions set forth in the Table was found to be effective as a finish restorer for broken, crazed or alligatored finishes. Formulation 5 was found to produce the best results, and the procedure for making Formulation 5 will therefore be used to exemplify the invention in greater detail.

30 ml Kasil #6 (potassium silicate) was mixed with 150 ml of water to form a diluted silicate stock. 20 ml triethanolamine was mixed with 150 ml of water to form a diluted triethanolamine stock. These two stocks were then thoroughly mixed. 50 ml of 10% aqueous lecithin was then added to the combined stocks and mixed. Finally, 100 ml of boiled linseed oil was added slowly with stirring. The resulting finish restorer contained 6% Kasil #6, 4% triethethanolamine, 1% lecithin, 20% linseed oil, and the balance water.

TABLE

| Formulation | % Triethanolamine | Potassium Silicate | % Lecithin | % Linseed Oil |
| --- | --- | --- | --- | --- |
| 1 | 4 | 8 | .4 | — |
| 2 | 5 | 8 | .4 | 6 |
| 3 | 6 | 8 | 2.0 | — |
| 4 | 3.33 | 5 | 1.67 | 16.67 |
| 5 | 4 | 6 | 1.0 | 20 |
| 6 | 3.33 | 5 | .83 | 33.34 |
| 7 | 3.33 | 5 | .33 | 33.34 |
| 8 | 4 | 6 | .6 | 24 |
| 9 | 4 | 6 | .8 | 22 |
| 10 | 4 | 6 | .8 | 18 |
| 11 | 4 | 6 | 1 | — |
| 12 | 4 | 6 | 0.5 | — |

I claim:

1. A finish restorer capable of removing a crazed and broken surface layer from a finish and leaving a cosmetically acceptable smooth finish comprising mono-, di-, or triethanolamine, a silicate, lecithin and water.

2. A finish restorer according to claim 1, wherein the finish is selected from the group consisting of shellac, lacquer, oil-finish, varnish, oil-based paint, casein paint, and combinations thereof.

3. A finish restorer according to claim 1, wherein the silicate is sodium or potassium silicate.

4. A finish restorer according to claim 3, comprising 5% to 8% potassium silicate.

5. A finish restorer according to claim 1, further comprising a drying oil.

6. A finish restorer according to claim 5, wherein the drying oil is linseed oil.

7. A finish restorer comprising an aqueous mixture of 3% to 6% triethanolamine, 5% to 8% potassium silicate, and 0.4% to 2% lecithin.

8. A finish restorer according to claim 7, further comprising up to 35% linseed oil.

9. A method of restoring a partially broken and crazed finish comprising the steps of
   (a) (a) applying to the broken and crazed finish an aqueous composition comprising mono-, di-, or triethanolamine, a silicate, and a protective colloid;
   (b) rubbing the composition into the broken and crazed finish to remove in succession surface soil, ground-in dirt, and the broken and crazed part of the finish; and
   (c) removing the composition to leave a cosmetically-acceptable smooth restored finish.

10. A method according to claim 9, wherein the finish to be restored is selected from the group consisting of shellac, lacquer, oil-finish, varnish, oil-based paint, casein paint, and combinations thereof.

11. A method according to claim 10, wherein the composition further comprises a drying oil.

12. A method according to claim 10, wherein the composition comprises 3% to 6% triethanolamine, 5% to 8% potassium silicate, and 0.4% to 2% lecithin.

13. A method according to claim 11, wherein the composition comprises 3% to 6% triethanolamine, 5% to 8% potassium silicate, 0.4% to 2% lecithin, and up to 35% linseed oil.

* * * * *